United States Patent [19]

Roberts, Jr.

[11] 4,090,469
[45] May 23, 1978

[54] BREAST ROLLER PIVOTING

[75] Inventor: Arthur W. Roberts, Jr., Colonial Heights, Va.

[73] Assignee: Inta-Roto, Inc., Richmond, Va.

[21] Appl. No.: 775,582

[22] Filed: Mar. 8, 1977

[51] Int. Cl.² .............................................. B05C 3/12
[52] U.S. Cl. ..................................... 118/410; 425/327
[58] Field of Search ............... 118/410, 411; 425/224, 425/115, 327, 363; 427/434 R, 355-366

[56] References Cited

U.S. PATENT DOCUMENTS

| 2,195,101 | 3/1940 | Swab ................................ 118/410 X |
| 3,418,970 | 12/1968 | Phelps et al. ......................... 118/410 |
| 3,635,631 | 1/1972 | Fields ............................. 425/224 X |
| 3,869,304 | 3/1975 | Bogulslawski et al. ......... 118/410 X |

*Primary Examiner*—Morris Kaplan
*Attorney, Agent, or Firm*—Cushman, Darby & Cushman

[57] ABSTRACT

A web coating assembly for applying hot melt adhesives or the like as a coating on a web including a structure for mounting either the breast roller or the extrusion head to minimize web breakage at the extrusion head hot melt applying opening. A lead-in wedge is formed between the breast roller and the extrusion head forming lip; a structure is provided for effecting pivotal movement of the extrusion head and breast roller with respect to each other so that the size of the lead-in wedge increases at a greater rate during relative movement between the extrusion head and the breast roller than the distance of the coating thickness determination portion of the extrusion head from the breast roller. If the breast roller is pivotally mounted, the stationary pivot point therefor is located on the same side of the vertical center line of the extrusion head opening as the lead-in wedge, and is located vertically above a horizontal plane passing through the center of the breast roller. If the extrusion head is pivotally mounted, the stationary pivot point therefor is located on the opposite side of the vertical center line of the extrusion head opening as the lead-in wedge and vertically below a horizontal plane passing through the connection point of a lever arm for mounting the head to the head.

6 Claims, 3 Drawing Figures

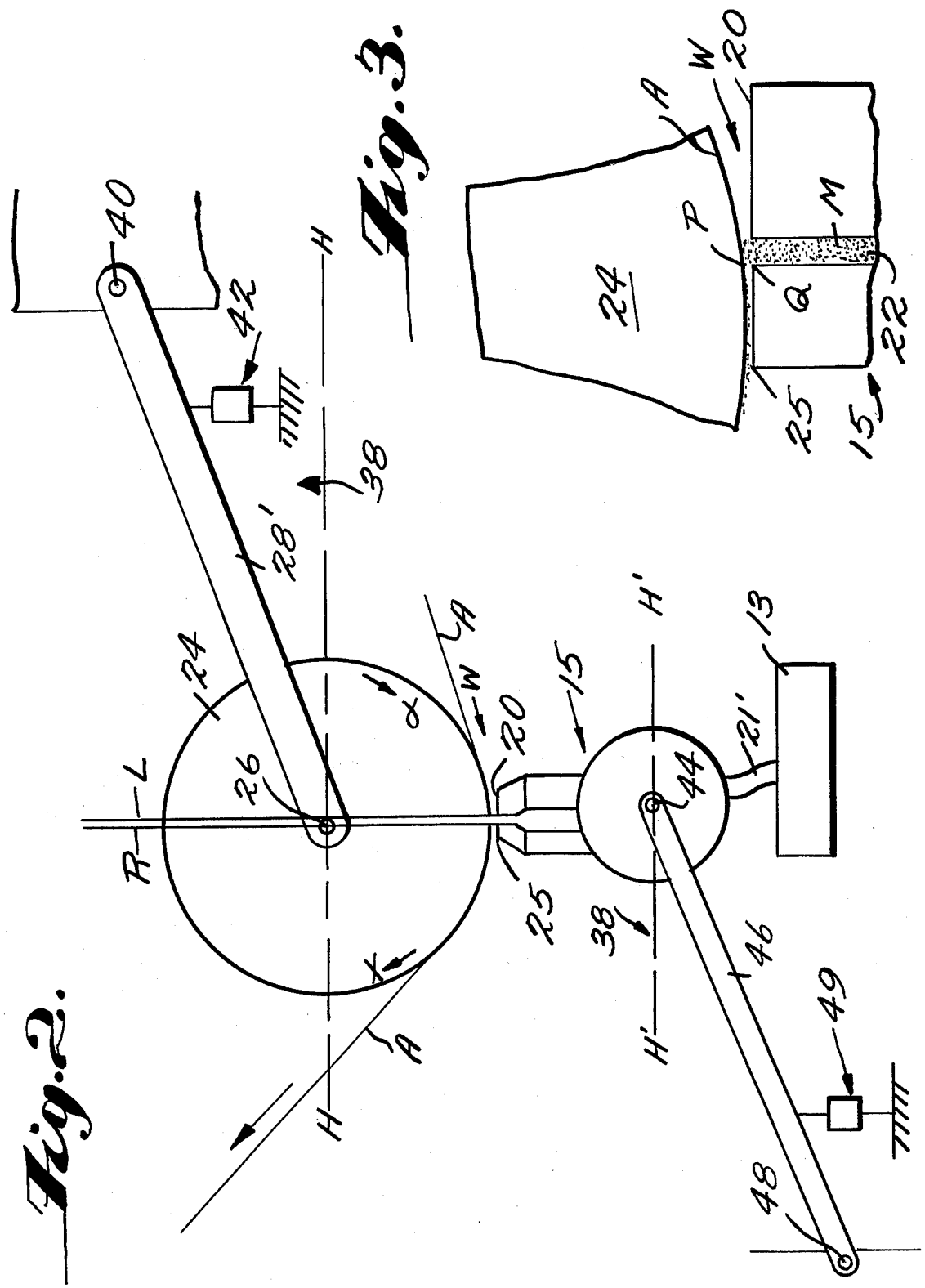

BREAST ROLLER PIVOTING

BACKGROUND AND SUMMARY OF THE INVENTION

Apparatus has been developed by Spectra Inc. of Cincinnati, Ohio that successfully applies hot melts and other high viscosity materials to webs. Such apparatus generally includes a tank for the hot melt in which the hot melt is heated and maintained in liquid form, a pump submerged in the tank for delivering the hot melt to an extrusion head under a small pressure, a flat upper surface of the extrusion head with an elongated narrow opening therein, and a breast roller of hard material cooperating with the extrusion head and spaced just above the extrusion head opening, the centerline through the extrusion head opening not being coextensive with any radius of the breast roller. In operation, a web of paper or the like is fed onto the breast roller and between the breast roller and extrusion head. The distance of the breast roller from a coating thickness determination point of the extrusion head is adjusted by movement of the breast roller relative to the head thereby adjusting the thickness of coating material applied.

While the appratus developed by Spectra Inc. is extremely useful for coating webs with high viscosity materials, it has several drawbacks. One drawback is that webs of varying caliper cannot be effectively treated; low quality paper of uneven caliper when forced through the small area between the extrusion and the breast roller either is not coated properly or has a tendency to break. Of course, excessive web breakage results in an unacceptable amount of down time, and makes economic operation of the machine prohibitive.

In the past, there have been various proposals for eliminating the drawbacks of excessive web breakage in the Spectra Inc. device. One solution to the problem is to only utilize high quality paper, however, this limits the operability of the structure and increases the cost of the coated material. In another solution that has been proposed in copending commonly assigned U.S. application Ser. No. 645,619 filed Dec. 31, 1975, is to apply the hot melt material onto the surface of a roller, and use that roller as a transfer roller to apply the hot melt onto a web moving past that roller guided by a roller coated with resilient material. While this successfully avoids the web breakage problem, it does require the utilization of another roller system, which can make the capital costs higher than desirable.

According to the present invention, the web breakage problem inherent in the prior art is solved in a simple manner by providing a particular mounting for the roller or the extrusion head for movement relative to each other. Means are provided for mounting the extrusion head and breast roller for pivotal movement with respect to each other so that the size of the lead-in wedge (formed by the roller and the extrusion head forming lip) increases at a greater rate during relative movement between the extrusion head and the breast roller than the distance of the coating thickness determination portion of the extrusion head from the breast roller. This wedge increase also allows more room for air bubbles to burst into the atmosphere, thereby eliminating entrapped air and holes in the required homogeneous coating, and therefore resulting in an improved end product.

Preferably, the mounting means according to the present invention includes means for pivotally mounting the breast roller with respect to a stationary extrusion head, the pivotal movement mounting means including a lever arm operatively connected to the breast roller substantially at the center thereof, and a stationary pivot point for the lever arm located on the same side of the vertical centerline of the extrusion head opening as the lead-in wedge, and located vertically above a horizontal plane passing through the center of the breast roller. Once the breast roller and extrusion head are lapped and stoned, pivotal movement of the breast roller results in the desired lead-in wedge dimension with respect to coating thickness, and minimizes the chances of web breakage at the extrusion head opening. Alternatively, the extrusion head may be pivotally mounted as by a lever arm operatively connected to the head at a given point. In this case, a stationary pivot point for the lever arm is located on the opposite side of the vertical centerline of the extrusion head opening as the lead-in wedge, and located vertically above a horizontal plane passing through the connection point of the lever arm to the head. Depending upon the distance the extrusion head opening is from the feed within the hot melt applying machine, a tangent to the breast roller at the point of intersection of a vertical radius of the roller and the exterior surface of the roller will either be parallel to the forming lip or make an angle $\beta$ of about 1° with the forming lip.

It is the primary object of the present invention to provide an assembly for web coating with a hot melt that minimizes web breakage at the extrusion head opening. This and other objects of the invention will become clear from an inspection of the detailed description of the invention and from the appended claims.

BRIEF DESCRIPTION OF THE DRAWINGS

FIG. 2 is a schematic view of an exemplary assembly according to the present invention; and FIG. 3 is a detailed view of the area between the extrusion head and breast roller of FIG. 2

DETAILED DESCRIPTION OF THE INVENTION

Figure 1:
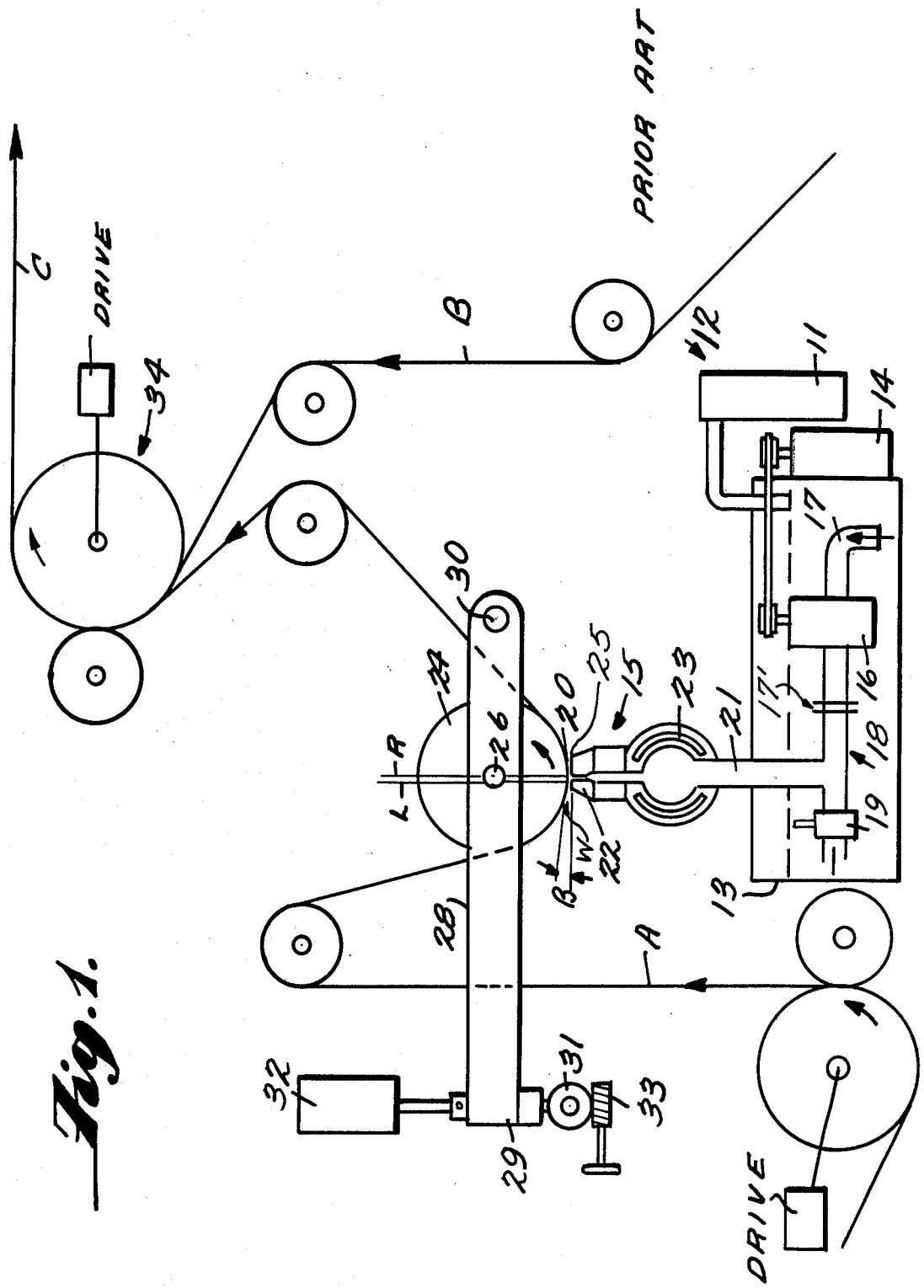
FIG. 1 is a schematic view of a prior art device utilized by Spectra, Inc. for application of high viscosity material onto a web.

One assembly that has been utilized by Spectra Inc. of Cincinnati, Ohio that has been very successful in applying hot melt materials and other high viscosity materials to webs is shown in FIG. 1. According to this assembly, hot melt material in solid form in a shipping container 11 is melted by a dispensing apparatus 12 associated directly with the container 11. The apparatus 12 may be apparatus such as shown in U.S. Pat. No. 3,282,469. The liquid coating material is passed from container 11 to a tank 13 that is heated by hot oil, electricity, etc., to a temperature to maintain the material in high viscosity liquid form. Material from tank 13 is fed from the tank 13 to an extrusion head 15 for ultimate coating onto a web A such as release paper, face paper, or the like. Pump 16 in tank 13, which is actually submerged below the level of liquid in the tank 13, draws coating material in through inlet 17 and passes it through a filter 17' to junction 18. (The pump 16 may be powered by motor 14). At junction 18, the material may either flow up through passage 21 to the extrusion head 15, or through by-pass valve 19. By-pass valve 19 is controlled relative to the speed of pump 16 so that a slight back pressure develops, forcing high-viscosity fluid under slight pressure up passage 21 from junction 18 to head 15.

Extrusion head 15, which is preferably heated by hot oil or the like flowing in jacket 23, has a flat upper surface 20 (forming lip) with an opening 22 formed therein, the opening 22 being narrow (i.e., 0.060 inch) and of a length corresponding substantially to the width of the head 15. The head 15 cooperates with a breast roller 24 which is made of steel or other hard, regular, precision material. Web A passes between roller 24 and head 15, and material is applied thereto through opening 22 in head 15 to web A. A lead-in wedge W is formed by the roller 24 and the forming lip 20.

The roller 24 is rotatable about a substantially horizontal axis 26, and the distance between the roller 24 and head 15 may be adjusted to determine the thickness of the coating to be applied (specifically the distance between coating thickness determination portion 25 and roller 24). Adjustment of this distance is accomplished by adjustment of lever 28 which mounts roller 24, which lever 28 is pivotal about point 30. An eccentric cam 31 engages the opposite end (29) of lever 28 from pivot point 30, and adjustment of screw 33 adjusts cam 31 to vary which portion thereof is in engagement with end 29 of lever 28. An air cylinder 32 is provided to exert a downward pressure against lever 28 to counteract the pressure created by the web tension and the pump 16. This cylinder also serves to lift the end 29 of the lever 28 etc. This air cylinder 32 is provided for lifting the end 29 of lever 28 out of engagement with cam 31, and thus allowing free passage of web A between roller 24 and head 15 without any coating thereof. When the roller 24 is moved upwardly with respect to the head 15, the wedge W does not increase in size at a rate greater than the distance of point 25 from roller 24.

The head 15 and roller 24 are so mounted that a centerline L passing through opening 22 in head 15 is not coextensive with any radius R of roller 24, and so that a tangent T passing through the intersection point of a vertical radius R of roller 24 with the surface of the roller either (a) makes a small angle $\beta$ with respect to the flat upper surface 20 of head 15, the angle $\beta$ being approximately 1°, or (b) is parallel to surface 20 ($\beta=0$), depending upon the distance of the opening 22 from the feed 21 from within the assembly 13. The angle $\beta$ may be varied depending upon web material, coating material, etc., but it always remains small. With such an arrangement, coating materials of viscosities 60,000 cps and higher (and as low as 3,000 cps) have been applied to paper. In making pressure sensitive adhesive labels and the like, the web A is joined with another web B by pinch rollers 34 to make a combined web C. The coating may be applied to either the face paper or the release paper, although it is preferred that the web A be the release paper, and the web B the face paper.

With the structure of FIG. 1, there is a tendency for a great deal of web breakage at opening 22. This cannot be solved by moving the head 15 transversely since it is necessary for a relief angle to be provided at the end of the head 15 otherwise there is no control over coating weight. According to the present invention, the web breakage problem inherent in the prior art is solved merely by changing the pivot point for the roller 24 and/or by providing a particular pivot for the extrusion head 15. An exemplary assembly according to the present invention is shown in FIGS. 2 and 3, the assembly including means 38 for mounting the extrusion head 15 and breast roller 24 for pivotal movement with respect to each other so that the size of the lead-in wedge W increases at a greater rate during relative movement between the head 15 and roller 24 than the distance of the coating thickness determination portion 25 from the breast roller 24, thereby minimizing the web breakage at the opening 22.

The means 38 preferably comprises a lever arm 28' connected to the breast roller 24 substantially at the center or horizontal axis 26 thereof, and a stationary pivot point 40 for the lever arm 28. The pivot point 40 is located on the same side of the vertical centerline L of the extrusion head opening 22 as the lead-in wedge W, and is located vertically above a horizontal plane H—H passing through the center 26 of the roller 24. Suitable power means 42, such as a conventional hydraulic cylinder, may be provided for moving the roller 24 about pivot point 40, and any necessary adjustment or holding means may be provided.

Alternatively, the mounting means 38 may comprise a lever arm 46 operatively connected to extrusion head 15 at a given point 44, and a stationary pivot point 48 for the arm 46. The pivot point 48 is located on the opposite side of the vertical centerline L as the lead-in wedge W, and is located vertically below a horizontal plane H'—H' passing through the connection point 44 of the lever arm 46 to head 15. Suitable means 49, such as a hydraulic cylinder — similar to means 42 — may be provided for effecting pivotal movement of the head 15 about pivot point 48. When the head 15 is made movable, a flexible electrically heated hose 21' or the like is provided between the tank 13 and the head 15 for providing the necessary flow of hot melt to the head 15.

The means 42, 49 maintain, during coating, the roller 24 and head 15 in the relative position to which they have been moved.

As an inspection of FIG. 3 makes clear, when the means 38 are employed upon relative pivotal movement of the roller 24 and the head 15, the distance PQ at opening 22, and therefore the wedge W, will be increased a proportionally greater amount than the distance between the point 25 and the roller 24. Therefore, for a given coating thickness — which is determined by the distance between point 25 and roller 24 — the changes of breakage of web A at opening 22 are reduced, and additionally there is more room for air bubbles in hot melt M to burst into the atmosphere because of the increased relative size of wedge W, therefore minimizing entrapped air and holes in the coating applied, and increasing the homogeneity of the coating applied to web A.

In use, the roller 24 and head 15 are lapped and stoned, and then either (a) roller 24 is pivoted about point 40 to a given point to provide the necessary coating thickness, or (b) head 15 is pivoted about point 48 to provide the necessary coating thickness. Then web A is threaded between the roller 24 and head 15, hot melt M at the desired temperature and pressure is applied from tank 13 through flexible connection 21' to the head 15 and subsequently to the web A, as the roller 24 is rotated in direction $\alpha$, a wedge W being formed between the roller 24 and the forming lip 20 which effects the coating, air bubbles trapped in hot melt M being released into the atmosphere at wedge W.

It will be seen that according to the present invention, a simple assembly has been provided that solves the problem of excessive web breakage at the extrusion head opening that is inherent in the prior art, with the additional advantageous result of increased coating homogeneity. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and assemblies.

What is claimed is:

1. A web coating assembly comprising a source of heated high viscosity liquid coating material for coating a web; an extrusion head for applying the material onto a web, the extrusion head comprising an upper flat substantially horizontal surface having a narrow elongated opening formed therein of substantially the same length as the width of the extrusion head, said opening having a vertical centerline, said head having a forming lip and a coating thickness determination portion; means for supplying the material under pressure from said source to said extrusion head opening; a breast roller of hard material for contacting a web to be coated, said breast roller rotatable about a generally horizontal axis and positioned above said extrusion head opening for cooperation therewith, said breast roller being mounted with respect to said extrusion head so that no radius of said breast roller is coextensive with said extrusion head opening centerline and a lead-in wedge being formed by said roller and head forming lip; means for maintaining during coating the relative positions of said breast roller and said extrusion head; and means for feeding a web in contact with said breast roller past the lead-in wedge and then past said coating thickness determination portion, between said roller and said head forming lip; wherein the improvement comprises means for mounting said breast roller for pivotal movement with respect to said extrusion head, to control coating thickness, so that the size of said lead-in wedge increases at a greater rate during relative movement between said head and roller than the distance of said coating thickness determination portion of said head from said roller, so that web breakage at said extrusion head opening is minimized, said means including a lever arm operatively connected to said breast roller substantially at the center thereof, and a stationary pivot point for said lever arm located on the same side of said vertical centerline of said extrusion head opening as said lead-in wedge formed by said roller and said head forming lip, and located vertically above a horizontal plane passing through the center of said breast roller.

2. An assembly as recited in claim 1 wherein a tangent to said breast roller at the point of intersection of a vertical radius of said roller and the exterior surface of said roller is parallel to said forming lip.

3. An assembly as recited in claim 1 wherein a tangent to said breast roller at the point of intersection of a vertical radius of said roller and the exterior surface of said roller makes an angle $\beta$ of about 1° with said forming lip.

4. A web coating assembly comprising a source of heated high viscosity liquid coating material for coating a web; an extrusion head for applying the material onto a web, the extrusion head comprising an upper flat substantially horizontal surface having a narrow elongated opening formed therein of substantially the same length as the width of the extrusion head, said opening having a vertical centerline, said head having a forming lip and a coating thickness determination portion; means for supplying the material under pressure from said source to said extrusion head opening; a breast roller of hard material for contacting a web to be coated, said breast roller rotatable about a generally horizontal axis and positioned above said extrusion head opening for cooperation therewith, said breast roller being mounted with respect to said extrusion head so that no radius of said breast roller is coextensive with said extrusion head opening centerline and a lead-in wedge being formed by said roller and head forming lip; means for maintaining during coating the relative positions of said breast roller and said extrusion head; and means for feeding a web in contact with said breast roller past the lead-in wedge and then past said coating thickness determination portion, between said roller and said head forming lip; wherein the improvement comprises means for mounting said extrusion head for pivotal movement with respect to said breast roller so that the size of said lead-in wedge increases at a greater rate during relative movement between said head and roller than the distance of said coating thickness determination portion of said head from said roller, so that web breakage at said extrusion head opening is minimized, said means including a lever arm operatively connected to said head at a given point, and a stationary pivot point for said lever arm located on the opposite side of said vertical centerline of said extrusion head opening as said lead-in wedge formed by said roller and said head forming lip, and located vertically below a horizontal plane passing through the connection point of said lever arm to said head.

5. An assembly as recited in claim 4 wherein a tangent to said breast roller at the point of intersection of a vertical radius of said roller and the exterior surface of said roller is parallel to said forming lip.

6. An assembly as recited in claim 4 wherein a tangent to said breast roller at the point of intersection of a vertical radius of said roller and the exterior surface of said roller makes an angle $\beta$ of about 1° with said forming lip.

* * * * *